United States Patent
Li et al.

(10) Patent No.: US 10,614,209 B2
(45) Date of Patent: Apr. 7, 2020

(54) SOFTWARE RISK EVALUATION SYSTEM AND METHOD THEREOF

(71) Applicant: Quanta Computer Inc., Taoyuan (TW)

(72) Inventors: Tu-Jung Li, Taoyuan (TW);
Chen-Chung Lee, Taoyuan (TW);
Mei-Jung Wang, Taoyuan (TW);
Hung-Yu Yang, Taoyuan (TW);
Ming-Jen Chen, Taoyuan (TW);
Chia-Hung Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 249 days.

(21) Appl. No.: 15/675,956

(22) Filed: Aug. 14, 2017

(65) Prior Publication Data
US 2018/0260558 A1  Sep. 13, 2018

(30) Foreign Application Priority Data

Mar. 8, 2017  (TW) .............................. 106107507 A

(51) Int. Cl.
| | |
|---|---|
| *G06F 21/50* | (2013.01) |
| *G06Q 10/06* | (2012.01) |
| *G06F 21/10* | (2013.01) |
| *G06F 21/57* | (2013.01) |
| *H04L 29/06* | (2006.01) |
| *G06Q 40/08* | (2012.01) |

(Continued)

(52) U.S. Cl.
CPC ............ *G06F 21/50* (2013.01); *G06F 21/105* (2013.01); *G06F 21/57* (2013.01); *G06F 21/577* (2013.01); *G06Q 10/0635* (2013.01); *H04L 63/00* (2013.01); *H04L 63/1433* (2013.01); *G06F 21/45* (2013.01); *G06Q 40/08* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 9,552,480 B2 * | 1/2017 | Bell, Jr. | .................. H04L 63/20 |
| 10,402,570 B2 * | 9/2019 | Bhattacharya | ........ G06F 21/577 |

(Continued)

FOREIGN PATENT DOCUMENTS

| | | |
|---|---|---|
| CN | 103984623 A | 8/2014 |
| CN | 104217155 A | 12/2014 |

*Primary Examiner* — Kambiz Zand
*Assistant Examiner* — Arezoo Sherkat
(74) *Attorney, Agent, or Firm* — McClure, Qualey & Rodack, LLP

(57) ABSTRACT

A software risk evaluation system and method thereof are provided. The software risk evaluation system includes a computer system and a server. The computer system executes a software risk evaluation program to perform the steps of: scanning the computer system to obtain a software installation list of software installed on the computer system; obtaining a software risk management file from the server; setting a risk level for each software on the software installation list according to the software risk management file; adjusting the risk level of each software on the software installation list according to software asset management data and the software risk management file; and generating a software risk evaluation report according to the adjusted risk level of each software on the software installation list.

3 Claims, 3 Drawing Sheets

(51) Int. Cl.
*H04L 29/08* (2006.01)
*G06F 21/45* (2013.01)

(56) References Cited

U.S. PATENT DOCUMENTS

| | | | |
|---|---|---|---|
| 2006/0191012 A1* | 8/2006 | Banzhof | G06F 21/577 |
| | | | 726/25 |
| 2010/0114634 A1* | 5/2010 | Christiansen | G06Q 10/06 |
| | | | 705/7.28 |
| 2010/0242028 A1* | 9/2010 | Weigert | G06F 21/105 |
| | | | 717/131 |
| 2014/0165204 A1* | 6/2014 | Williams | G06F 21/577 |
| | | | 726/25 |
| 2016/0224911 A1* | 8/2016 | Rush | G06Q 10/0635 |
| 2018/0260572 A1* | 9/2018 | Bhattacharya | G06F 21/577 |

\* cited by examiner

SOFTWARE RISK EVALUATION SYSTEM AND METHOD THEREOF

CROSS REFERENCE TO RELATED APPLICATIONS

This Application claims priority of Taiwan Patent Application No. 106107507, filed on Mar. 8, 2017, the entirety of which is incorporated by reference herein.

BACKGROUND OF THE INVENTION

Field of the Invention

The invention relates to software risk evaluation, and, in particular, to a software risk evaluation system and method thereof.

Description of the Related Art

Using software licenses legally is one purpose of software license management in an enterprise. However, for software administrators, it is a great challenge to handle software installed on each computer and evaluate and control the risks of the installed software. Currently, software management tools provided by the software management industry can only search for existing software names, and this kind of software management tools is only capable of finding existing problems. However, this kind of software management tool cannot analyze and control the existing risks of the installed software. Accordingly, when a software program is not on the software management list and is installed and used on one of the managed computer systems without a legal license, it is too late for the software administrator to search for the installed software program because the software risk has occurred. In addition, if there are cracking tools for software licenses in some of the management computer systems and these cracking tools are also not within the software management list, these cracking tools may result in high software risks. Moreover, if the user modifies the software program names, it may also cause a burden for the software administrators. Thus, software management should not be limited to passive auditing, and the software administrators should actively handle and control the software risks.

Therefore, there is a demand for a software risk evaluation system and method to solve the aforementioned problem.

BRIEF SUMMARY OF THE INVENTION

A detailed description is given in the following embodiments with reference to the accompanying drawings.

In an exemplary embodiment, a software risk evaluation system is provided. The software risk evaluation system includes a computer system and a server. The computer system executes a software risk evaluation program to perform the steps of: scanning the computer system to obtain a software installation list of software installed on the computer system; obtaining a software risk management file from the server; setting a risk level for each software on the software installation list according to the software risk management file; adjusting the risk level of each software on the software installation list according to software asset management data and the software risk management file; and generating a software risk evaluation report according to the adjusted risk level of each software on the software installation list.

In another exemplary embodiment, a software risk evaluation method is provided. The method includes the steps of: scanning the computer system to obtain a software installation list of software installed on the computer system; obtaining a software risk management file from the server; setting a risk level for each software on the software installation list according to the software risk management file; adjusting the risk level of each software on the software installation list according to software asset management data and the software risk management file; and generating a software risk evaluation report according to the adjusted risk level of each software on the software installation list.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
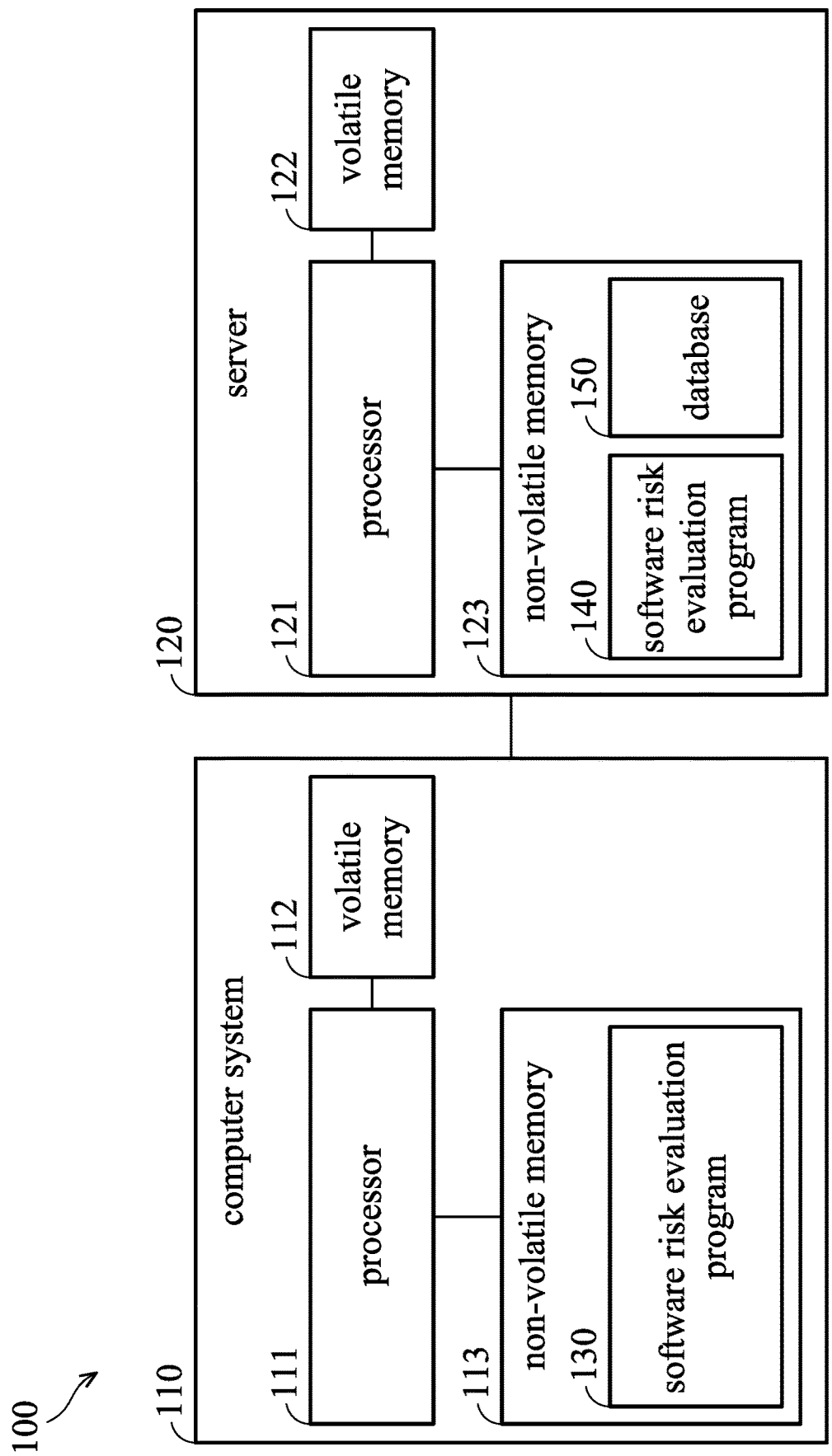
FIG. 1 is a block diagram of a cloud video system in accordance with an embodiment of the invention.

FIG. 1 is a block diagram of a software risk evaluation system in accordance with an embodiment of the invention.

As shown in FIG. 1, the software risk evaluation system 100 includes one or more computer systems 110 and a server 120. For example, the one or more computer systems 110 can be personal computers that are used by staff in enterprises or teachers and students in schools. The computer system 110 includes a processor 111, a volatile memory 112, and a non-volatile memory 113. The processor 111 may be a central processing unit (CPU), and the volatile memory 112 may be a static random access memory (SRAM) or a dynamic random access memory (DRAM), but the invention is not limited thereto.

The non-volatile memory 113 may be a hard-disk drive, a solid-state disk, or a flash memory. In an embodiment, the non-volatile memory 113 stores a software risk evaluation program 130, and the processor 111 loads the software risk evaluation program 130 from the non-volatile memory 113 to the volatile memory 112 for execution. For example, the software risk evaluation program 130 is capable of scanning each and every software program installed on the computer system 110, and evaluating a risk level and associated probability of occurrence for each software program, thereby adjusting the risk for each software program. In addition, the software risk evaluation program 130 is further capable of integrating scanning and auditing of the software programs installed on the computer system 110. For example, the software risk evaluation program 130 may integrate the software asset management (SAM) system with the scanning function, and generate a software risk evaluation report according to the evaluated risk level of each software program.

The server 120 is configured to manage the software risk evaluation report of each computer system 110 that can be set and adjust the risk probability of each software program. For example, the server 120 includes a processor 121, a volatile memory 122, and a non-volatile memory 123. The volatile memory 122 may be a static random access memory (SRAM) or a dynamic random access memory (DRAM), but the invention is not limited thereto.

The non-volatile memory 123 may be a hard-disk drive, a solid-state disk, or a flash memory. In an embodiment, the non-volatile memory 123 stores a software risk evaluation program 140, and the processor 121 loads the software risk evaluation program 140 from the non-volatile memory 123 to the volatile memory 122 for execution. The software risk evaluation program 140 is configured to provide software license management, applications for software, software auditing, and software risk adjustment to the software administrators.

Figure 2A:
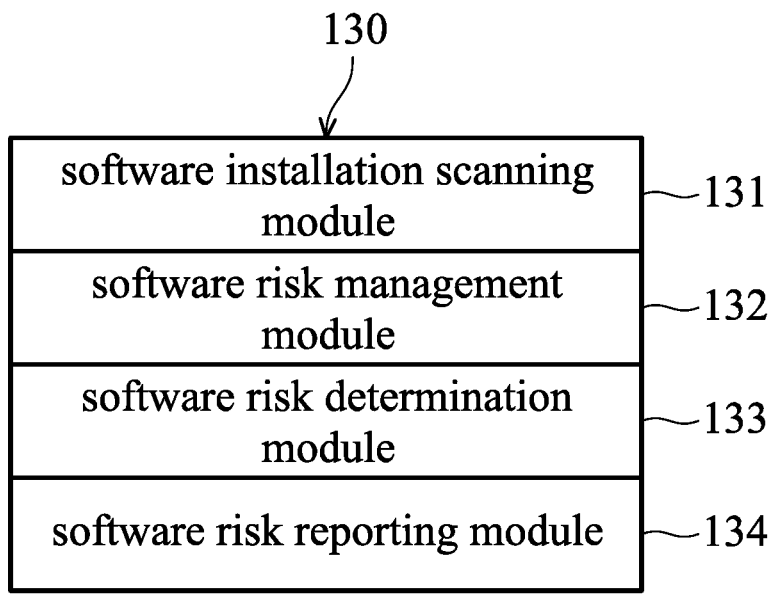
FIG. 2A is a block diagram of the software risk evaluation program 130 in accordance with an embodiment of the invention.

FIG. 2A is a block diagram of the software risk evaluation program 130 in accordance with an embodiment of the invention. As shown in FIG. 2A, the software risk evaluation program 130 includes a software installation scanning module 131, a software risk management module 132, a software risk determination module 133, and a software risk reporting module 134.

For example, the software installation scanning module 131 is configured to scan and collect a software installation list of each computer system 110. Each and every software program installed on the computer system 110 will be scanned and recorded on the software installation list. It should be noted that the software installation scanning module 131 may scan the software programs that are installed on the computer system 110 via software installers, and also scan portable programs stored in different disk drives or different operating systems. In addition, the software information collected by the software installation scanning module 131 includes but is not limited to software names, installation date, software versions, software companies, software installation paths, user name, and computer names.

The software risk management module 132 is configured to record a software risk management file that is provided to the software risk determination module 133 for determining software risks. In an embodiment, the software risk management file recorded by the software risk management module 132 can be stored in the non-volatile memory 113 of the computer system 110 in advance. In another embodiment, the computer system 110 may retrieve the latest software risk management file from the server 120 via a network. For example, the software risk management file includes: high-risk software, business software, cracked software, and system software. The content of the software risk management file can be classified into different categories according to the scan results from the software installation scanning module 131 and external data of each software program, and can be adjusted and updated via the software risk adjustment module 141.

The software risk determination module 133 performs risk evaluation of each software program on the software installation list according to the software risk management file. For example, the software risk determination module 133 performs several operations: (1) configuring risks according to the software risk level; (2) configuring risks according to the software risk probability; and (3) adjusting risks according to the software management information. The software risk determination module 133 may determine the risk level of each software program on the software installation list.

The software risk reporting module 134 is configured to generate a software risk evaluation report of the evaluated risk level of each software program determined by the software risk determination module 133 according to the software installation list. The software administrator may know the status of each installed software program and the number of software programs in each risk level according to the software risk evaluation report. The software risk evaluation report can be integrated into the software asset management system at the back end as an auditing record.

Figure 2B:
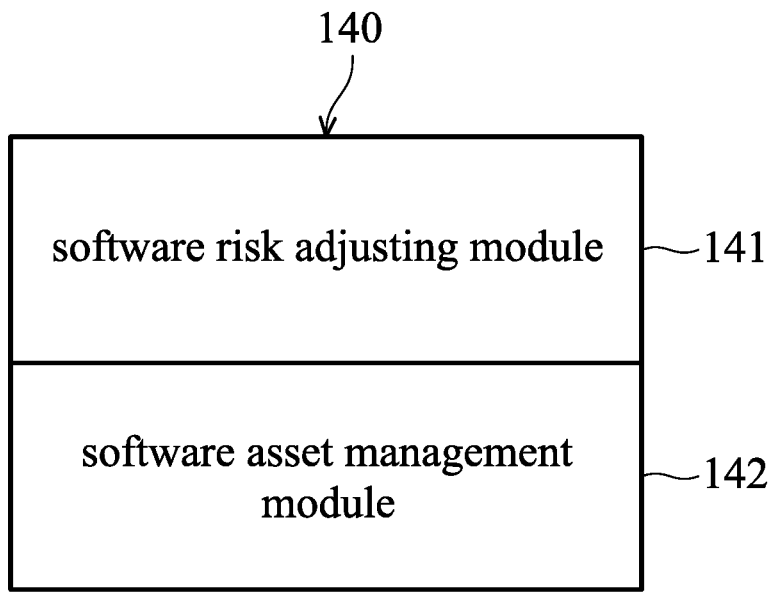
FIG. 2B is a block diagram of the software risk evaluation program 140 in accordance with an embodiment of the invention.

FIG. 2B is a block diagram of the software risk evaluation program 140 in accordance with an embodiment of the invention. As shown in FIG. 2B, the software risk evaluation program 140 includes a software risk adjustment module 141 and a software asset management module 142.

The software risk adjustment module 141 is configured to adjust the software risk management file according to feedback information. For example, the software risk adjustment module 141 may adjust the risk level and risk probability of each software program in the software risk management file according to external data and auditing records, and update the software risk management file, thereby improving the accuracy of determining software risks.

The software asset management module 142 may be a software asset management system built in the enterprise. The software risk evaluation mechanism may be integrated into the software asset management system. For example, the software risk determination results can be adjusted according to authorized software licenses, software applying records, auditing records, thereby increasing the accuracy of the software risk determination results. For example, although a high-risk software program is installed on the computer system 110, the risk level of the high-risk software program can be lowered when the enterprise has an authorized license for this high-risk software program and the high-risk software program is approved for an official application and installed on the computer system 110, and the high-risk software program is legal on the auditing record. Thus, the software risk determination result can be more reasonable.

It should be noted that there are millions of software programs on the market that can be installed on the computer system 110, and the software administrator cannot examine the software programs installed on each computer system 110 one by one and manually evaluate the risk level of each installed software program. The software administrator may roughly classify the software programs into categories such as by software type or by software manufacturer, and assign a reasonable risk level for each category. Then, the software installation scanning module 131 installed on each computer system 110 may scan software programs installed on the computer system 110 to build a software installation list, and the software risk determination module 133 may determine the risk level of each software program on the software installation list according to the software risk management file (e.g. it can be obtained offline or online). Then, the software risk reporting module 134 may generate a software risk evaluation report that is transmitted to the server 120. The software risk evaluation report of each computer system 110 can be stored in a database 150 of the server 120. The operations of the software modules in the software risk evaluation program 130 can be executed periodically or executed upon detecting a new software program being installed or the status of existing software programs being changed.

Table 1 is a diagram of risk levels of each software program in accordance with an embodiment of the invention.

TABLE 1

| Software | RL (initial) | RL (paid soft.) | RL (crack soft.) | RL (system soft.) | RL (BSA) | RL (Auth.) | RL (Approved) | RL (Auditing approved) |
|---|---|---|---|---|---|---|---|---|
| A | 3 | 4 | 4 | 4 | 5 | 4 | 3 | 2 |
| B | 3 | 3 | 5 | 5 | 5 | 5 | 5 | 5 |
| C | 3 | 4 | 4 | 4 | 4 | 4 | 4 | 4 |
| D | 3 | 3 | 3 | 1 | 1 | 1 | 1 | 1 |
| E | 3 | 3 | 3 | 1 | 1 | 1 | 1 | 1 |
| F | 3 | 4 | 4 | 4 | 5 | 5 | 5 | 5 |
| G | 3 | 4 | 4 | 4 | 4 | 4 | 4 | 4 |
| H | 3 | 3 | 3 | 1 | 1 | 1 | 1 | 1 |
| I | 3 | 4 | 4 | 4 | 5 | 4 | 4 | 4 |
| J | 3 | 4 | 4 | 4 | 4 | 4 | 4 | 4 |

In table, RL denotes "risk level". As shown in Table 1, the initial risk levels of software program A~J are set to 3. For example, the risk level can be classified into different levels such as from 1 to 5 (not limited), where risk level 1 indicates a very low risk level, and risk level 5 indicates a very high risk level. The software determination module 133 may adjust the risk level of each software program according to different software types. For example, the software types in the software asset management system can be roughly classified into paid software, cracked software, system software, Business Software Alliance (BSA) software, authorized software, approved software, and auditing-approved software, but the invention is not limited thereto.

For example, software A belongs to paid software and BSA software, and the user of software A is authorized (i.e. having a valid license), approved (i.e. granted for applying for software A), and auditing-approved. Software B belongs to cracked software. Software C, G, and J belong to paid software. Software D, E, H belong to system software. Software F belongs to paid software and BSA software. Software I belongs to paid software, BSA software, and is authorized. The overall risk level of each software will be calculated from the left-most column (i.e. RL (initial)) to the right-most column (i.e. RL (auditing passed)).

Specifically, if specific software belongs to paid software, it indicates that the specific software is legal after purchasing the associated software licenses, and the risk level of the specific software is increased by 1. If the specific software belongs to BSA software, the risk level will be increased for the enterprise, and thus the risk level of the specific software is increased by 1. If the specific software belongs to cracked software, it indicates that the specific software has a very high risk, and thus the risk level of the specific software is set to the highest risk level of 5. If the specific software belongs to system software such as an operating system, a system utility program, or an anti-virus program, it indicates that the risk level of the specific software is very low, and thus the risk level of the specific software is set to the lowest risk level of 1.

Additionally, the enterprise may purchase licenses for specific software, but the licenses cannot be provided to each user in the enterprise for installation and usage due to there being a limited number of licenses. Specifically, the user has to apply for the specific software to the software administrator, and the risk level of the specific software can only be lowered after auditing of the specific software is approved. That is, if the enterprise has purchased licenses for specific software and the user installs and uses the specific software without approval, it indicates that the risk level of the specific software installed on the computer system 110 of the user will be kept at a certain level, and thus the risk level of the specific software is left unchanged.

Referring to Table 1, the risk level of each software is only adjusted within corresponding attribute columns. For example, software A belongs to paid software and BSA software. The user has applied to the software administrator for software A, and there are valid licenses for software A (i.e. software A is authorized), the user is approved by the software administrator to install and use software A, and the auditing for software A is also approved. Accordingly, the calculation for the risk level of software A can be: increased by 1 due to paid software, increased by 1 due to BSA software, decreased by 1 due to being authorized, decreased by 1 due to approval of applying for software A, decreased by 1 due to auditing approval, and thus the resulting risk level of software A is 2. In another example, software I belongs to paid software, the risk level of software I is increased by 1. Software I also belongs to BSA software, and the risk level of software I is further increased by 1. However, the enterprise has purchased licenses for software I, but the user does not apply to the software administrator for software I, and the auditing for software I is not approved. Thus, the resulting risk level of software I will be kept at a high risk level of 4.

Figure 3:
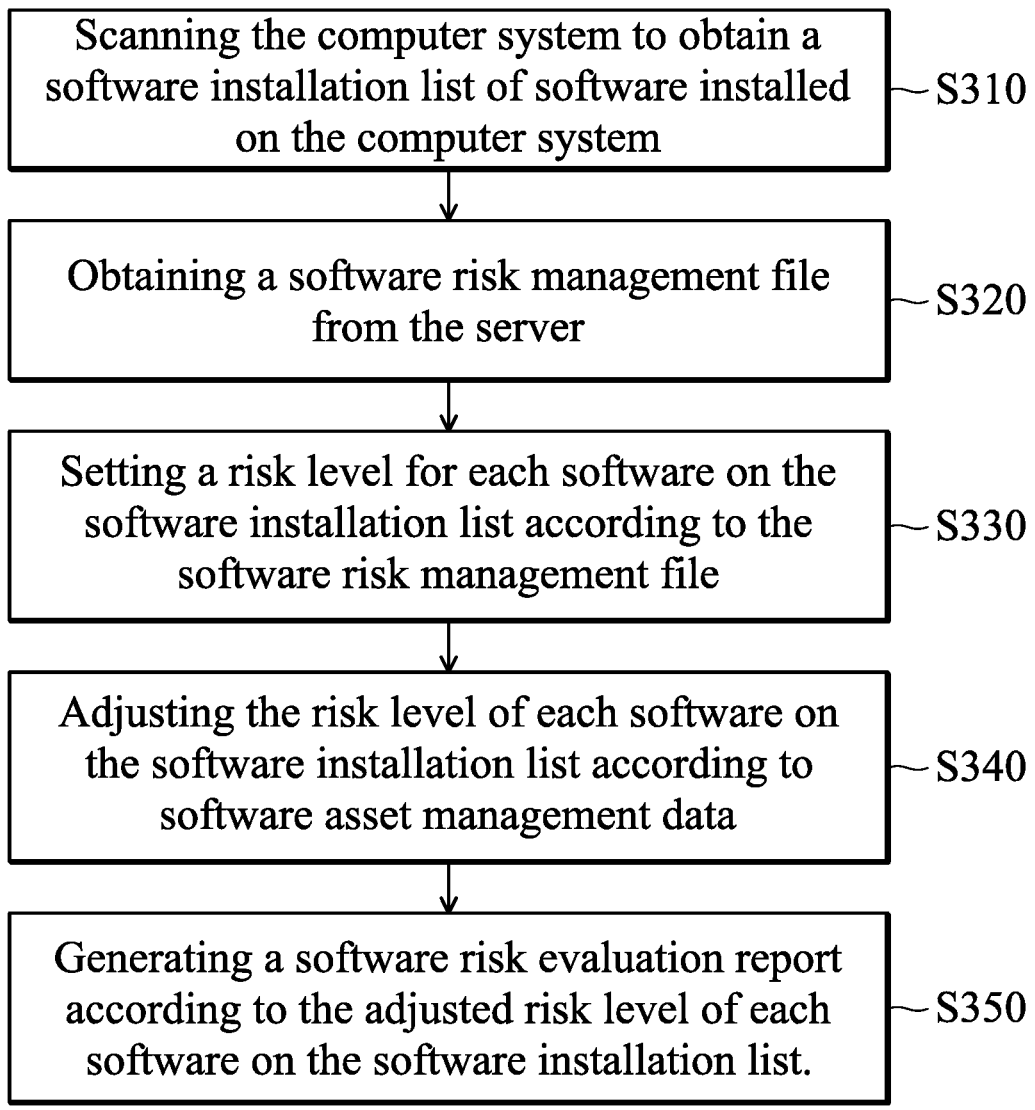
FIG. 3 is a flow chart of a software risk evaluation method in accordance with an embodiment of the invention.

FIG. 3 is a flow chart of a software risk evaluation method in accordance with an embodiment of the invention.

In step S310, a computer system is scanned to obtain a software installation list for the computer system.

In step S320, a software risk management file is obtained. For example, the software risk management module 132 may retrieve the software risk management file from the server 120 in advance, and the software risk determination module 133 may determine the risk level for each software offline. In some embodiments, the software risk management module 132 may synchronously retrieve the software risk management file from the server 120 via a network, and the software risk determination module 133 may determine the risk level for each software online.

In step S330, the risk level of each software on the software installation list is set according to the software risk management file. For example, software of different types may have different risk levels.

In step S340, the risk level of each software on the software installation list is adjusted according to software asset management data and the software risk management file. For example, details for the adjustment of the risk level of software of different software types and software management aspects (e.g. authorizing, applying, and auditing) are described in the embodiment of Table 1.

In step S350, a software risk evaluation report of the adjusted risk level of each software on the software installation list is generated. For example, the software administrator may take appropriate action on the software having a high risk level according to the software risk evaluation report from each computer system. If there is a software asset management system at the back end, the software risk evaluation report can be integrated into the software asset management system to generate a software auditing record.

In view of the above, a software risk evaluation system and method are provided in the invention. The software risk evaluation system and method are capable of scanning software installed on one or more computer system to generate a software installation list, and risk evaluation can be performed on each software on the software installation list. For example, a software risk evaluation report can be generated. The software administrator may take appropriate action on software having a high risk level according to the software risk evaluation report from each computer system.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A software risk evaluation system, comprising:
    a computer system, comprising
    a processor; and
    a memory configured to store a software risk evaluation program; and
    a server;
    wherein the processor of the computer system executes the software risk evaluation program to perform the steps of:
    scanning the computer system to obtain a software installation list of software installed on the computer system;
    obtaining a software risk management file from the server;
    setting a risk level for each software on the software installation list according to the software risk management file;
    adjusting the risk level of each software on the software installation list according to software asset management data and the software risk management file; and
    generating a software risk evaluation report according to the adjusted risk level of each software on the software installation list,
    wherein the software risk management file comprises an initial risk level, a risk probability, and a software type for each software,
    wherein the software risk evaluation report is integrated into a software asset management system of the server that follows a software risk policy of an enterprise, and the software risk evaluation report is integrated into a software auditing record.

2. The system as claimed in claim 1, wherein the computer system obtains the software risk management file from the server in advance, and adjusts the risk level of each software on the software installation list offline according to the software risk management file and the software asset management data.

3. The system as claimed in claim 1, wherein the computer system synchronously obtains the software risk management file from the server via a network, and adjusts the risk level of each software on the software installation list online according to the software risk management file and the software asset management data.

* * * * *